United States Patent
He et al.

(10) Patent No.: US 11,351,803 B2
(45) Date of Patent: Jun. 7, 2022

(54) PRINTING SCREEN, TOUCH PANEL, PRODUCTION METHOD OF TOUCH PANEL, AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Xiaoyue He, Beijing (CN); Qingpu Wang, Beijing (CN); Taofeng Xie, Beijing (CN); Li Yin, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 298 days.

(21) Appl. No.: 16/614,536

(22) PCT Filed: May 6, 2019

(86) PCT No.: PCT/CN2019/085735
§ 371 (c)(1),
(2) Date: Nov. 18, 2019

(87) PCT Pub. No.: WO2020/019815
PCT Pub. Date: Jan. 30, 2020

(65) Prior Publication Data
US 2021/0323330 A1 Oct. 21, 2021

(30) Foreign Application Priority Data
Jul. 27, 2018 (CN) .......................... 201810845534.2

(51) Int. Cl.
*B41M 1/12* (2006.01)
*B41F 15/36* (2006.01)
*G06F 3/044* (2006.01)

(52) U.S. Cl.
CPC ............... *B41M 1/12* (2013.01); *B41F 15/36* (2013.01); *G06F 3/044* (2013.01); *G06F 2203/04103* (2013.01)

(58) Field of Classification Search
CPC . B41M 1/12; B41M 3/00; B41F 15/36; G06F 3/044; G06F 2203/04103
See application file for complete search history.

(56) References Cited

U.S. PATENT DOCUMENTS

| 2005/0053892 A1* | 3/2005 | Shiromizu | C04B 41/52 432/251 |
| 2008/0017053 A1* | 1/2008 | Araumi | B41N 1/24 101/127 |

(Continued)

FOREIGN PATENT DOCUMENTS

| CN | 201516725 U | 6/2010 |
| CN | 202694316 U | 1/2013 |

(Continued)

OTHER PUBLICATIONS

First Chinese Office Action issued in Chinese Patent Application No. 201810845534.2 dated Nov. 27, 2019.

*Primary Examiner* — Hong Zhou
(74) *Attorney, Agent, or Firm* — ArentFox Schiff LLP; Michael Fainberg

(57) ABSTRACT

Disclosed are a printing screen, a touch panel, a production method of the touch panel, and a display device. The printing screen includes a frame and a screen body fixed on the frame, wherein a pattern region of the screen body is provided with a plurality of via holes formed through the screen body, and the screen body is provided with a first surface and a second surface; and areas of sections, located on the first surface, of the via holes are larger than areas of (Continued)

sections, located on the second surface, of the via holes in a direction parallel to the screen body.

9 Claims, 9 Drawing Sheets

(56) References Cited

U.S. PATENT DOCUMENTS

| | | | | |
|---|---|---|---|---|
| 2009/0239091 A1* | 9/2009 | Abe | ................... | H05K 3/1225 |
| | | | | 428/546 |
| 2011/0120326 A1* | 5/2011 | Nakashima | ....... | H01L 21/76801 |
| | | | | 101/127 |
| 2012/0034379 A1* | 2/2012 | Wang | ................... | B41M 1/12 |
| | | | | 427/248.1 |
| 2017/0177108 A1* | 6/2017 | Sebastian | ................ | B32B 27/06 |
| 2017/0297324 A1* | 10/2017 | Wang | ................... | H01L 51/56 |
| 2017/0348962 A1 | 12/2017 | Xiao | | |
| 2021/0134868 A1* | 5/2021 | Tsujio | ............... | H01L 27/14685 |

FOREIGN PATENT DOCUMENTS

| | | | |
|---|---|---|---|
| CN | 102991101 A | 3/2013 | |
| CN | 103019453 A | 4/2013 | |
| CN | 203919977 U | 11/2014 | |
| CN | 105116687 A | 12/2015 | |
| CN | 206231042 U | 6/2017 | |
| CN | 207156660 U | 3/2018 | |
| CN | 108958564 A | 12/2018 | |
| JP | H08258443 A | 10/1996 | |
| JP | 2008132738 A | 6/2008 | |

\* cited by examiner

PRINTING SCREEN, TOUCH PANEL, PRODUCTION METHOD OF TOUCH PANEL, AND DISPLAY DEVICE

CROSS REFERENCE OF RELATED APPLICATION

The application is a National Stage of International Application No. PCT/CN2019/085735, filed on May 6, 2019, which claims priority to Chinese Patent Application No. 201810845534.2, entitled "PRINTING SCREEN, TOUCH PANEL, PRODUCTION METHOD OF TOUCH PANEL, AND DISPLAY DEVICE", filed to Patent Office of the People's Republic of China on Jul. 27, 2018, both of which are incorporated herein by reference in their entireties.

FIELD

The disclosure relates to the technical field of touch control and in particular relates to a printing screen, a touch panel, a production method of the touch panel, and a display device.

BACKGROUND

With the development of display and touch technologies, people have higher and higher requirements on a touch screen, and the better touch property is very popular with widespread consumers. Compared with a resistive touch screen, a capacitive touch screen has the advantages such as sensitive responsiveness, small possibility of abrasion and usability realized by one calibration or without calibration, in addition, a capacitor technology is superior to a resistor technology on the aspects of optical loss and system power consumption, while a One Glass Metal Mesh (OGM) and a One Glass Solution (OGS) have the advantages such as simple structure, lightweight, thinness and good light transmission properties, and a glass substrate and a fitting process are omitted, so that the production cost may be favorably reduced, and the yield of a product may be increased.

SUMMARY

A printing screen provided by some embodiments of the disclosure includes:

a frame;

a screen body fixed on the frame, wherein a pattern region of the screen body is provided with a plurality of via holes formed through the screen body, and the screen body is provided with a first surface and a second surface;

and areas of sections, located on the first surface, of the via holes are larger than areas of sections, located on the second surface, of the via holes in a direction parallel to the screen body.

Alternatively, in some embodiments of the disclosure, the via holes comprise holes shaped like prismatic frustums or holes shaped like circular truncated cones.

Alternatively, in some embodiments of the disclosure, an inclination angle of the via holes is within the range of 45-67 DEG Alternatively, in some embodiments of the disclosure, the via holes are the holes shaped like regular prismatic frustums, and the inclination angle is determined according to following formula:

$$\sin\theta = \frac{d}{h};$$

wherein $\theta$ represents for the inclination angle, d represents for a thickness of the printing screen, and h represents for a slant height of the via holes.

Alternatively, in some embodiments of the disclosure, the via holes are the holes shaped like circular truncated cones, and the inclination angle is determined according to following formula:

$$\sin\theta = \frac{d}{a};$$

wherein $\theta$ represents for the inclination angle, d represents for a thickness of the printing screen, and a represents for a generatrix length of the via holes.

Alternatively, in some embodiments of the disclosure, the via holes comprise a plurality of sub-via holes in a direction from the first surface to the second surface, and the plurality of sub-via holes in a same via hole form a step shape.

Alternatively, in some embodiments of the disclosure, the screen body comprises at least two layers of sub-screen bodies; a pattern region of the sub-screen bodies is provided with a plurality of sub-via holes formed through the sub-screen bodies, and areas of the sections, parallel to the first surface, of the sub-via holes forming a same via hole sequentially decrease in the direction from the first surface to the second surface.

Alternatively, in some embodiments of the disclosure, a shape of the sub-via holes is a right cylinder.

Alternatively, in some embodiments of the disclosure, difference values of the areas of the sections, parallel to the first surface, of any two adjacent sub-via holes forming a same via hole are equal to each other.

Alternatively, in some embodiments of the disclosure, the inclination angle of the via holes is within the range of 45-67 DEG Alternatively, in some embodiments of the disclosure, thicknesses of the sub-via holes are same in the direction from the first surface to the second surface.

Alternatively, in some embodiments of the disclosure, the inclination angle is determined according to following formula:

$$\tan\theta = \frac{2\left(n - \frac{3}{2}\right)b}{X1 - X2};$$

wherein $\theta$ represents for the inclination angle, n represents for a total number of the sub-via holes in a same via hole, b represents for a thickness of one of the sub-via holes, X1 represents for a maximum value of side lengths of the section, vertical to the first surface, of the first sub-via hole in a same via hole in the direction that from first surface to the second surface, and X2 represents for a minimum value of the side lengths of the section, vertical to the first surface, of the last sub-via hole in the same via hole in the direction from the first surface to the second surface.

Alternatively, in some embodiments of the disclosure, a shapes of the sections, parallel to the first surface, of the via holes includes at least one of square, round or rectangle.

Some embodiments of the disclosure further provide a production method of a touch panel, including:

forming touch electrodes in a touch region of a substrate, and forming outgoing lines electrically connected with the touch electrodes in a one-to-one correspondence way in a bezel region;

enabling the second surface of the aforementioned printing screen to face the substrate, and forming a corrosion-resistant layer covering the outgoing lines in the bezel region by adopting the printing screen.

Alternatively, in some embodiments of the disclosure, the forming a corrosion-resistant layer covering the outgoing lines in the bezel region by adopting the printing screen includes:

printing ink of which the viscosity is within a range of 2040 CPS-2760 CPS in the bezel region by adopting the printing screen to form the corrosion-resistant layer covering the outgoing lines.

Some embodiments of the disclosure further provide a touch panel which is produced by adopting the aforementioned production method;

the touch panel includes:

a substrate;

touch electrodes located in a touch region of the substrate;

outgoing lines, located in a bezel region of the substrate and electrically connected with the touch electrodes in a one-to-one correspondence way; and a corrosion-resistant layer, located in the bezel region of the substrate;

an orthographic projection of the corrosion-resistant layer on the substrate covering orthographic projections of the outgoing lines on the substrate.

Some embodiments of the disclosure further provide a display device including the touch panel.

DETAILED DESCRIPTION OF THE EMBODIMENTS

In order to make objects, technical solutions and advantages of some embodiments of the disclosure clearer, the technical solutions of some embodiments of the disclosure will be more clearly and completely described below in combination with accompanying drawings of some embodiments of the disclosure. Obviously, the described embodiments are merely parts of, rather than all some embodiments of the disclosures. Based on the described embodiments of the disclosure, all other embodiments obtained on the premise that no creative work is provided by the ordinary skill in the art fall into the scope of the disclosure.

Unless defined otherwise, all technical and scientific terms used herein have the same meaning as commonly understood by one of ordinary skill in the art to which this technology belongs. Terms "first" and "second" as well as similar terms used herein merely intend to distinguish different components, rather than to represent for any order, number or importance. Similar terms such as "include" or "include" mean that elements or objects appearing in front of the terms cover elements or objects appearing behind the terms and equivalents thereof without excluding other elements or objects.

Generally, an OGM and an OGS have been widely applied to various display devices such as a television, a mobile phone or a tablet personal computer, in addition, the OGM and the OGS may also be applied to the field of vehicle-mounted displays, however, problems to be solved by an OGM or OGS manufacturer are that vehicle audit is relatively rigorous and there are extremely strict requirements on the trustworthiness and reliability of a vehicle-mounted electronic product. It is generally required that the product may be still effectively used for more than 120 h at the temperature 85 DEG C. and the humidity of 85%, which requires relatively high corrosion resistance of the touch screen. However, at present, the metal lines may not be completely shielded by the ink due to relatively low printing precision so as to be easy to corrode.

Figure 1:
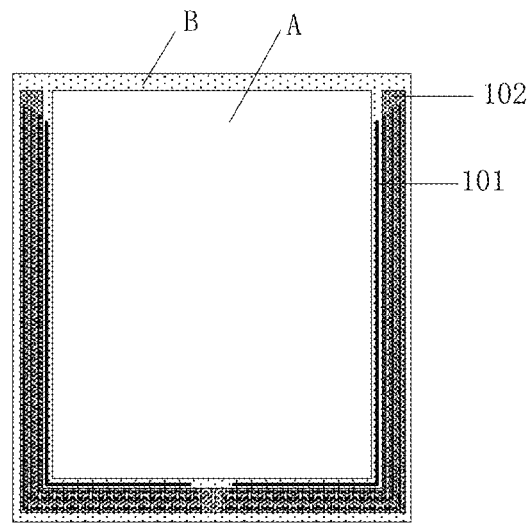
FIG. 1 is a structural schematic diagram of a touch panel in the related art.

As shown in FIG. 1, generally, metal lines 101 of a touch screen are arranged in a bezel region (a region B as shown in FIG. 1) surrounding a display region (a region A as shown in FIG. 1), and the lines are protected by coating the position where the metal lines 101 are located with ink 102, so that the metal lines 101 are prevented from being corroded. However, if the distance from the ink 102 for screen printing to the edge of the display region A is excessively short (for example, smaller than 3 mm), the ink 102 is likely to flow into the display region A before being cured due to relatively low precision of screen printing of the ink. Therefore, the distance from the ink 102 to the display region A is generally about 3 mm in order to avoid the phenomenon that the ink flows into the display region A to affect the display effect. Thus, there is a certain distance from the edge of the ink 102 and the display region A, so that the ink is incapable of completely shielding the metal lines 101, the metal lines 101 are easy to corrode so as to be broken, and furthermore, the touch effect is affected. In addition, in the actual application, the metal lines 101 are generally made of pure aluminum or aluminum alloy, while aluminum (Al) is very easy to corrode, and thus, the metal lines made of aluminum are very easy to corrode. Therefore, materials such as copper (Cu) and silver (Ag) which are high in price, but excellent in corrosion resistance have to be adopted in order to improve the quality of a display device, so that the production cost is greatly increased.

The corrosion principle of the metal lines are described below in combination with accompanying drawings by taking metal lines made of aluminum as examples.

Figure 2:
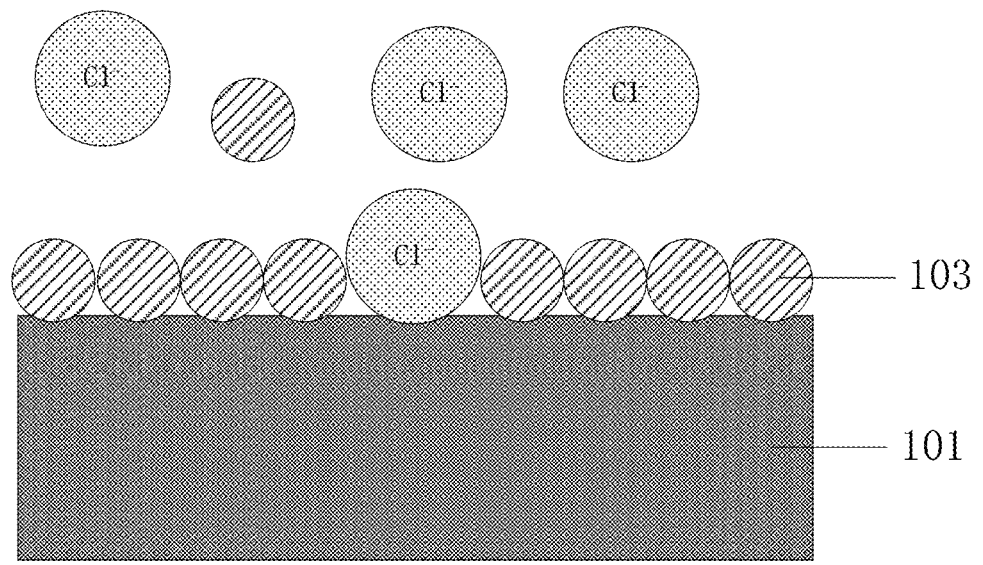
FIG. 2 and FIG. 3 are schematic diagrams that metal lines are corroded.

As shown in FIG. 2, aluminum is a metal with relatively high activity, the surfaces of the metal lines 101 easily oxidizes in the air to form a layer of oxidation film 103, the components of the oxidation film 103 may be expressed as $Al_2O_3 \cdot H_2O$ (namely AlOOH), and a chemical reaction of the components is shown as follows:

$$Al + H_2O \rightarrow AlOH + H^+ + e^-;$$

$$AlOH + H_2O \rightarrow Al(OH)_2 + H^+ + e^-;$$

$$Al(OH)_2 \rightarrow AlOOH + H^+ + e^-.$$

Also referring to FIG. 2, the following reaction is easily generated in a place with relatively high activity such as a crystal boundary due to the existence of $Cl^-$ in the air, and therefore, the metal lines 101 are subjected to corrosive pitting:

$$AlOH + Cl^- \rightarrow AlOHCl + e^-;$$

$$AlOHCl + Cl^- \rightarrow AlOHCl_2 + e^-.$$

Figure 3:
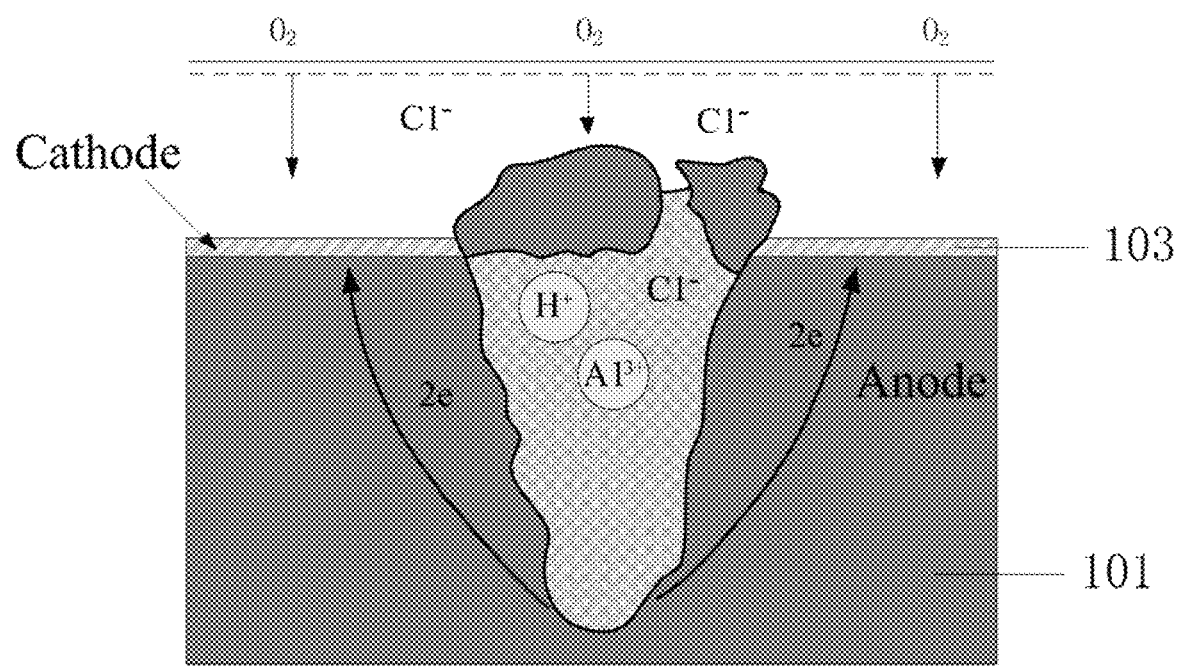

A chloride ion is generally a corrosive pitting excitant and has a relatively strong bond with metal ions so as to be an effective ion invading a passive film. As shown in FIG. 3, the potentials of a defective region and a region free from defects are different, the defective region becomes an activated anode, the region free from defects surrounding the defective region become a cathode, and therefore, an occluded battery is formed. The anode is very small in area and very high in current density, so that corrosive pitting is formed on the surface of metal, then, the dissolved metal ions are hydrolyzed to generate $H^+$ and make the PH value of a local solution be reduced, and the concentration of $H^+$ is increased to intensify the dissolution of the metal, so that corrosive pitting is expanded and deepened until the metal is perforated.

Figure 4:
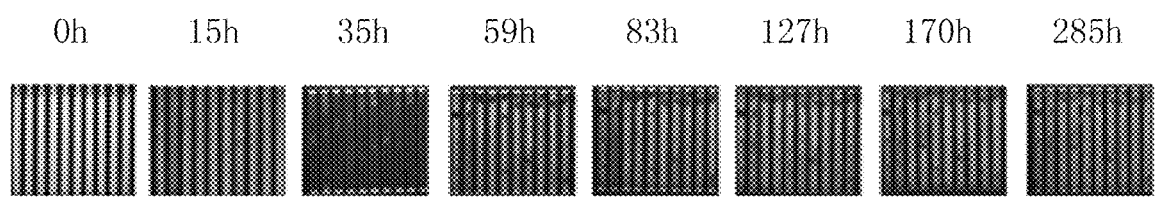
FIG. 4 is a schematic diagram of an aging test result of an OGM product with a structure as shown in FIG. 1.
Figure 5:
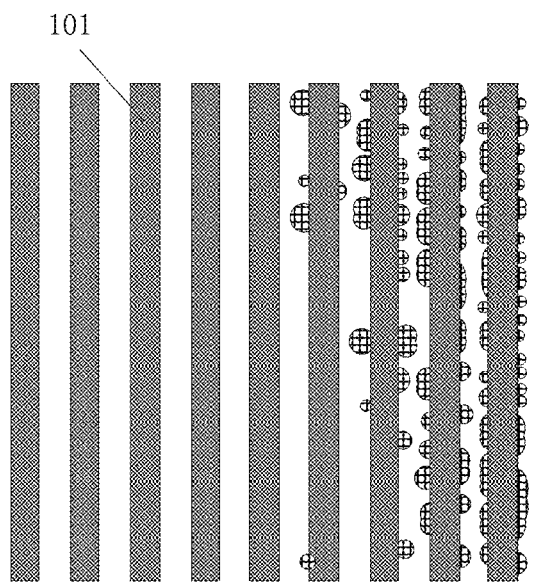
FIG. 5 is a partial enlarged diagram of an image corresponding to 35 h in FIG. 4.
Figure 6:
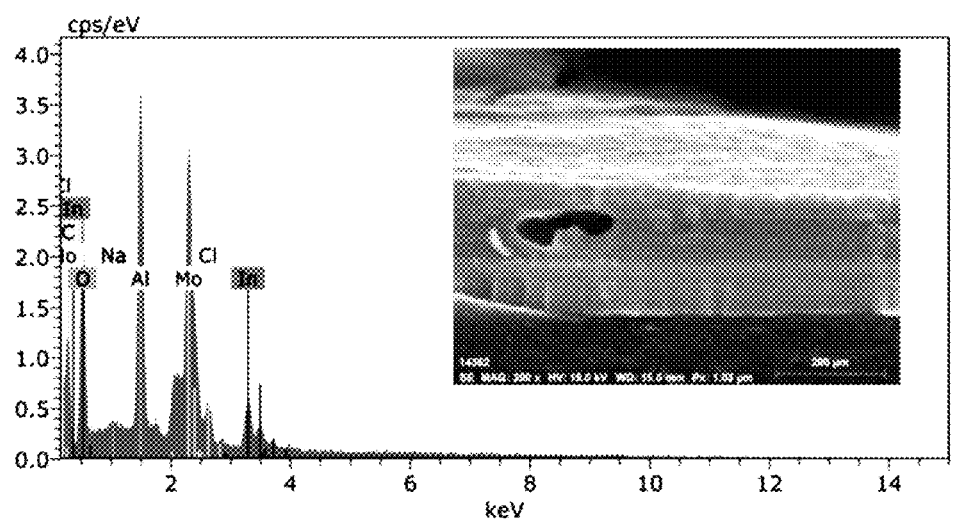
FIG. 6 is an analytical diagram of components of the corroded metal lines.

An OGM product with a structure as shown in FIG. 1 is subjected to aging test under the environments that the temperature is 85 DEG C. and the humidity is 85%, as shown in FIG. 4, the product starts to be corroded after being placed in the environment for 15 h. As shown in the figure, an image corresponding to 35 h has been seriously corroded after 35 h, FIG. 5 is a partial enlarged diagram of the image corresponding to 35 h in FIG. 4, a position closer to the right side is closer to the display region in FIG. 5, namely the metal lines 101 close to the right side are not shielded by the ink, seen from FIG. 5, the metal lines 101 which are not shielded by the ink are relatively seriously corroded, the lines may be broken on a position corroded relatively seriously, and therefore, corrosion is further performed in the environment until all the metal lines not shielded by the ink are corroded after 285 h. Moreover, a corrosion phenomenon may even extend to a position shielded by the ink, the metal lines on the corroded position may be obviously thickened, the metal is oxidized to enlarge so as to burst a protective layer on an upper layer, a result as shown in FIG. 6 is obtained by analyzing the components on the position, and seen from the result, there are also aluminum and oxygen elements on the position, which proves that the corrosion principle of the metal lines are met.

For the problem that the metal lines may not be completely shielded by the ink due to low printing precision so as to be easy to corrode, some embodiments of the disclosure provide a printing screen, a touch panel, a production method of the touch panel, and a display device.

The implementations of the printing screen, the touch panel, the production method of the touch panel, and the display device provided by some embodiments of the disclosure are described in detail below in combination with accompanying drawings. The thickness and shape of each film layer in the accompanying drawings only intend to illustrate the content of the disclosure, rather than to reflect the true proportion.

Figure 7:
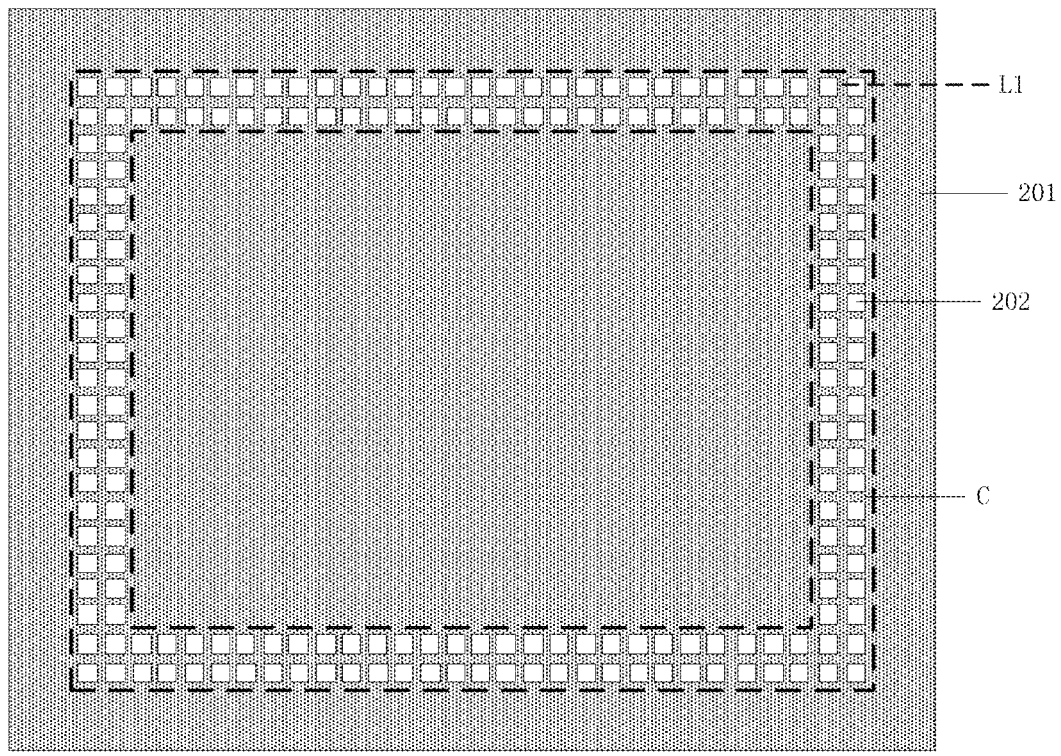
FIG. 7 is a vertical structural schematic diagram of a printing screen provided by some embodiments of the disclosure.

The printing screen provided by some embodiments of the disclosure, as shown in FIG. 7, includes a frame (not shown in the figure) and a screen body 201 fixedly arranged on the frame, wherein a pattern region C (namely a region between two black dotted boxes in the figure) of the screen body 201 is provided with a plurality of via holes 202 formed through the screen body. Moreover, referring to FIG. 8 at the same time, FIG. 8 is a schematic diagram of a sectional structure along dotted lines L1 in FIG. 7, namely, a sectional view at the dotted lines L1, and the screen body 201 may include a first surface S1 and a second surface S2; in addition, the areas of the sections, located on the first surface S1, of the via hole 202 are larger than the areas of the sections, located on the second surface S2, of the via hole 202 in a direction parallel to the screen body 201.

According to the printing screen provided by some embodiments of the disclosure, ink may be gathered towards the centers of the via holes in a printing process by making the areas of the sections, located on the first surface, of the via holes be larger than the areas of the sections, located on the second surface, of the via holes in the direction parallel to the screen body, namely making the hole diameters of the via holes in the second surface be smaller than the hole diameters of the via holes in the first surface, so that the position of the ink is more precise, and furthermore, the printing precision is improved. The printing ink may be closer to the display region when the touch panel is produced, so that a corrosion-resistant layer obtained by printing may cover more metal lines, and furthermore, the metal lines are not easy to corrode.

It should be explained that the printing precision may be interpreted as a difference of a design value and an actual value of printing in some embodiments of the disclosure. Moreover, the printing precision may be designed and determined according to an actual application environment and is not limited herein.

Figure 8:
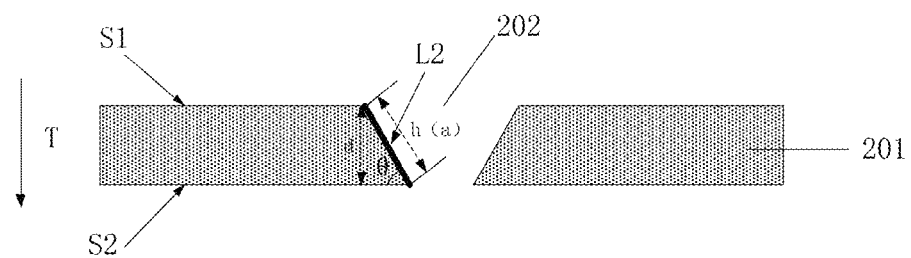
FIG. 8 is a first sectional schematic diagram of the printing screen provided by some embodiments of the disclosure.

During specific implementation, in some embodiments of the disclosure, as shown in FIG. 8, the areas of sections, in a direction parallel to the screen body, of the via hole 202 tend to decrease in a direction from the first surface S1 to the second surface S2 (a direction pointed by an arrow T as shown in FIG. 8). Thus, ink may be gathered towards the centers of the via holes in a printing process by arranging the via holes in a way that the areas of the sections in the direction parallel to the screen body tend to decrease, so that the position of the ink is more precise, the printing precision is improved, the ink for printing may be closer to the display region when the touch panel is produced so as to ensure that the corrosion-resistant layer obtained by printing may cover more metal lines, and furthermore, the metal lines are not easy to corrode. It should be explained that the printing precision may be interpreted as the difference of the design value and the actual value of printing in some embodiments of the disclosure.

Alternatively, the printing screen provided by some embodiments of the disclosure may be applied to screen printing equipment and may also be applied to other equipment, and the application scenarios of the printing screen are not limited herein.

During specific implementation, in some embodiments of the disclosure, as shown in FIG. 7, the metal lines are generally located in the bezel region, surrounding the display region, of the touch panel, the ink covering the metal lines is also located in the bezel region, and therefore, the pattern region C on the screen body 201 is set to be shaped like a loop corresponding to the bezel region of the touch panel. During specific implementation, the pattern of the pattern region C may be set according to an actual demand, and the shape of the pattern region C is only illustrated herein, rather than to be limited. In addition, FIG. 7 is illustrated by taking the via holes 202 which are square as examples, during specific implementation, the via holes 202 may also be of other shapes such as rounds and rectangles, but are not limited herein, a limited number of via holes are only illustrated in the figure in order to more clearly illustrate the via holes, and the number of the via holes may be determined according to the actual demand during specific implementation, but is not limited herein.

Figure 9:
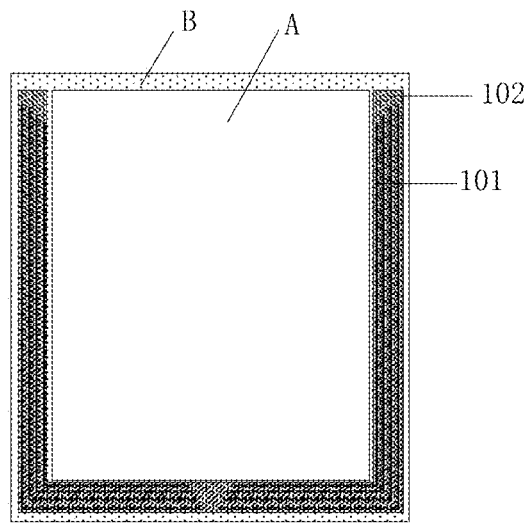
FIG. 9 is a structural schematic diagram of a touch panel provided by some embodiments of the disclosure.

During specific implementation, in some embodiments of the disclosure, as shown in FIG. 8, the screen body 201 is provided with the first surface S1 and the second surface S2, during printing, the ink is placed on the first surface S1, and the scraper moves in a printing direction to make the ink leak onto a printed material (namely a to-be-printed panel) through the via holes 202, so that the pattern is printed onto the printed material. The areas of the sections, in the direction parallel to the screen body 201, of the via hole 202 tend to decrease in the direction from the first surface S1 to the second surface S2 (the direction pointed by the arrow T), namely the hole diameters of the via hole 202 are smaller and smaller in the direction shown by the arrow T, and then, slurry (such as the ink) may be gathered towards the centers of the via holes in the printing process, so that the position of the slurry is more precise, and the printing precision is improved. As shown in FIG. 9, the ink 102 for printing may be closer to the display region A by using the printing screen provided by some embodiments of the disclosure when the touch panel is produced, so that the metal lines 101 may be completely covered, and furthermore, the metal lines are not easy to corrode. Exemplarily, the printing precision of the printing screen provided by some embodiments of the disclosure may reach 0.78 mm, the distance from the corrosion-resistant layer obtained by ink printing to the edge of the display region is only 1 mm, a certain distance originally exists between the metal lines in the bezel region and the display region in order to avoid affecting the display effect, and therefore, the corrosion-resistant layer obtained by some embodiments of the disclosure may almost cover all the metal lines in the bezel region.

Figure 10:
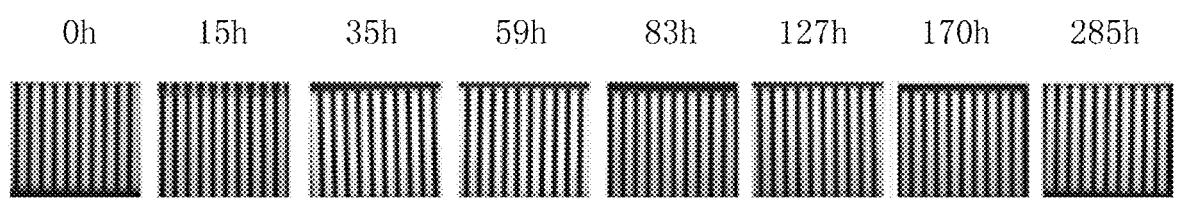
FIG. 10 is a schematic diagram of an aging test result of an OGM product with a structure as shown in FIG. 9.

During specific implementation, in some embodiments of the disclosure, FIG. 10 is a schematic diagram of an aging test result obtained by carrying out an aging test on an OGM product with a structure as shown in FIG. 9 in an environment with the temperature being 85 DEG C. and the humidity being 85%. It may be obviously seen from FIG. 10 that the product is not obviously corroded after being placed in the environment for 285 h, which may prove that the corrosion-resistant layer (namely an ink layer) produced by adopting the screen provided by some embodiments of the disclosure may ensure that the metal lines are not corroded, and the yield of the product is relatively high.

During specific implementation, in some printing screens provided by some embodiments of the disclosure, the via holes may include holes shaped like prismatic frustums or holes shaped like circular truncated cones. Exemplarily, the via holes may be set as the holes shaped like prismatic frustums. Each prismatic frustum may be interpreted as a geometric solid between a section obtained after a pyramid is cut by a plane parallel to the bottom of the pyramid and the bottom. Exemplarily, the via holes may be set as the holes shaped like circular truncated cones. Each circular truncated cone may be interpreted as a geometric solid between a section obtained after a cone is cut by a plane parallel to the bottom of the cone and the bottom. FIG. 8 is the schematic diagram of the sectional structure along the dotted lines L1 in FIG. 7, namely, a sectional schematic diagram at the dotted lines L1. For the via holes shaped like prismatic frustums or circular truncated cones, all edges obtained after the via hole 202 is cut by a plane vertical to the first surface S1 are all slashes shown as the slashes L2 in FIG. 8. The areas, of the sections, in the direction parallel to the screen body, of the via hole 202 gradually decrease in the direction pointed by the arrow T, the edges of the via hole 202 are the slashes L2, and therefore, the shapes of the sections of the via hole 202 are inverted trapezoids in the sections as shown in FIG. 8.

During specific implementation, in the printing screen provided by some embodiments of the disclosure, the inclination angles of the via holes may be set within the range of 45-67 DEG. Thus, the printing precision of the printing screen may be relatively high.

During specific implementation, the via holes may be holes shaped like regular prismatic frustums, in some embodiments of the disclosure, referring to FIG. 8, the inclination angles θ may be determined according to the following formula:

$$\sin\theta = \frac{d}{h};$$

wherein θ represents for the inclination angles, d represents for the thickness of the printing screen, and h represents for the slant heights (the length of the slashes L2 in FIG. 8) of the via holes.

It should be explained that the regular prismatic frustums may be interpreted as prismatic frustums with equal lateral edges, the sides of the regular prismatic frustums are of isosceles trapezoids which are the same in shape and equal in size, and the heights of the isosceles trapezoids are the slant heights.

During specific implementation, the via holes may be holes shaped like circular truncated cones, in some embodiments of the disclosure, also referring to FIG. 8, the inclination angles θ may be determined according to the following formula:

$$\sin\theta = \frac{d}{a};$$

wherein θ represents for the inclination angles, d represents for the thickness of the printing screen, and a represents for the generatrix lengths of the via holes.

It should be explained that each circular truncated cone is a geometric solid formed by rotating a right-angled trapezoid for 360 DEG by taking a waist, vertical to the bottom side, of the right-angled trapezoid as the axis, and the other waist, not vertical to the bottom side, of the right-angled trapezoid is a generatrix of the circular truncated cone.

Figure 11A:
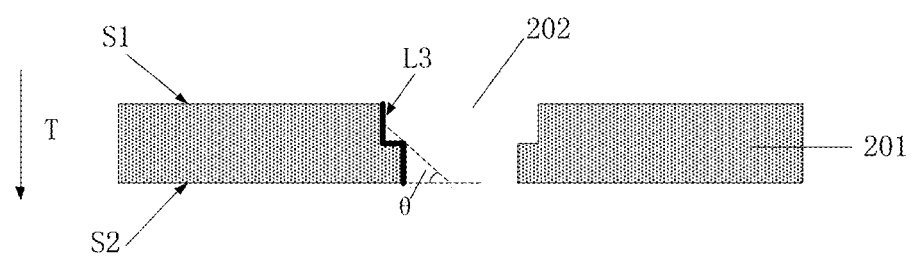
FIG. 11*a* is a second sectional schematic diagram of the printing screen provided by some embodiments of the disclosure.

During specific implementation, in further some printing screens provided by some embodiments of the disclosure, as shown in FIG. 11a to FIG. 12b, each via hole 202 may include a plurality of sub-via holes in the direction from the first surface S1 to the second surface S2 (the direction pointed by the arrow T as shown in FIG. 11a), and the plurality of sub-via holes in the same via hole 202 form a step shape. Thus, the via holes 202 may be set as stepped holes.

FIG. 11a to FIG. 12b are respectively the other sectional views at the dotted lines L1 in FIG. 7, edges obtained after the via hole 202 is cut by a plane vertical to the first surface S1 are broken lines shown as broken lines L3 as shown in FIG. 11a to FIG. 12b. The areas, of the sections, in the direction parallel to the screen body, of the via hole 202 tend to decrease in the direction pointed by the arrow T, the edges of the sections, vertical to the first surface S1, of the via hole 202 are the broken lines L3, and therefore, the edges of the via hole 202 are ladder-shaped in the sections, vertical to the first surface S1, of the via hole 202 as shown in FIG. 11a to FIG. 12b.

Figure 11B:
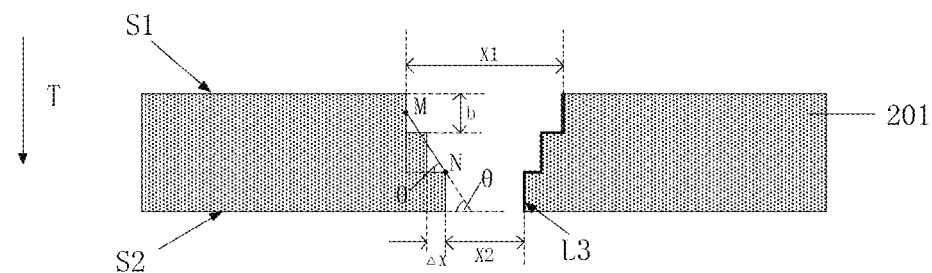
FIG. 11*b* is a third sectional schematic diagram of the printing screen provided by some embodiments of the disclosure.
Figure 12A:
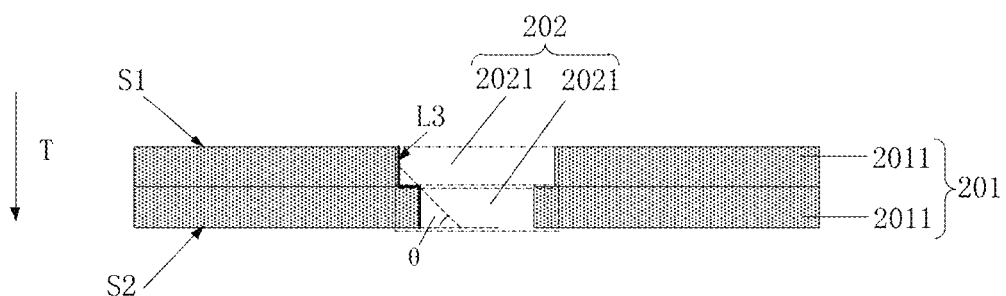
FIG. 12*a* is a fourth sectional schematic diagram of the printing screen provided by some embodiments of the disclosure.
Figure 12B:
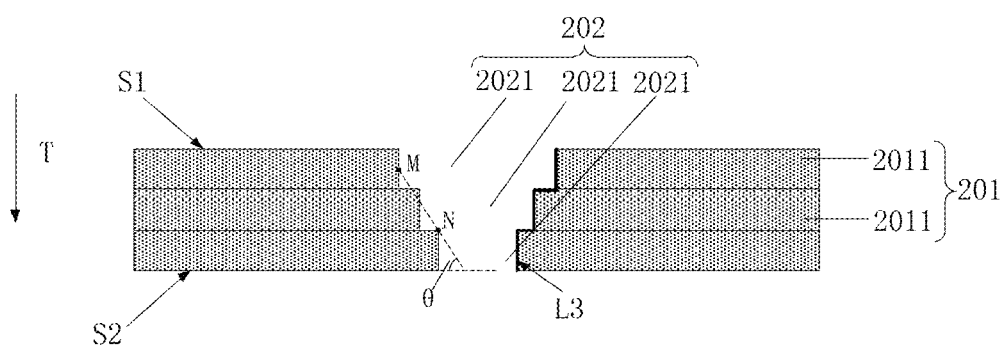
FIG. 12*b* is a fifth sectional schematic diagram of the printing screen provided by some embodiments of the disclosure.

Exemplarily, during specific implementation, as shown in FIG. 11a and FIG. 12a, the via hole 202 may include two sub-via holes. Or, as shown in FIG. 11b and FIG. 12b, the via hole 202 may also include three sub-via holes. Of course, the via hole 202 may also include four or five or six sub-via holes or sub-via holes with other numbers. In the actual application, the number of the sub-via holes in the via hole 202 may be designed and determined according to an actual application environment, but is not limited herein.

During specific implementation, in the printing screen provided by some embodiments of the disclosure, as shown in FIG. 11a and FIG. 11b, the screen body may be of an integrated structure, namely a screen body formed by a primary patterning process. Thus, the via hole formed by the plurality of sub-via holes may also be directly formed through the screen body.

During specific implementation, in the printing screen provided by some embodiments of the disclosure, as shown in FIG. 12a, FIG. 12 is the other sectional view at the dotted lines L1 in FIG. 7, and the screen body 201 may include at least two layers of sub-screen bodies 2011; and the pattern region of each of the sub-screen bodies 2011 is provided with a plurality of sub-via holes 2021 formed through the sub-screen body, the sub-via holes 2021 in the sub-screen bodies 2011 are in one-to-one correspondence, and all the sub-via holes 2021 which are located on the same position and correspond to each other form one via hole 202. Moreover, the areas of the sections, parallel to the first surface S1, of the sub-via holes 2021 forming the same via hole 202 sequentially decrease in the direction from the first surface S1 to the second surface S2, and thus, the via hole 202 may form the stepped hole by the sub-via holes 2021 which are located on the same position and correspond to each other. FIG. 12a is only illustrated by taking the screen body 201 including two layers of sub-screen bodies 2011 as an example, during specific implementation, the screen body may also include more layers of sub-screen bodies such as three layers of sub-screen bodies or four layers of sub-screen bodies, and the number of the sub-screen bodies is not limited herein.

Further, during specific implementation, the shapes of the sections, parallel to the first surface, of all the sub-via holes in the same via hole may be the same. Thus, the process difficulty may be lowered.

During specific implementation, in the printing screen provided by some embodiments of the disclosure, the shapes of the sub-via holes 2021 may be set as right cylinders. Further, the shapes of the sections, parallel to the first surface, of the via holes may include at least one of squares, rounds and rectangles. Exemplarily, the sections, parallel to the first surface, of the via hole may be square, and then, all sub-via holes forming the via hole may be set to be square, so that the sub-via holes can form a stepped via hole. Or the sections, parallel to the first surface, of the via hole may be round, and then, all sub-via holes forming the via hole may be set to be round, so that the sub-via holes can form a stepped via hole. Or the sections, parallel to the first surface, of the via hole may be rectangular, and then, all sub-via holes forming the via hole may be set to be rectangular, so that the sub-via holes can form a stepped via hole.

Referring to FIG. 12a, the sizes of the sub-via holes 2021 in different sub-screen bodies 2011 are different, and the hole diameters of the sub-via holes 2021 sequentially decrease in the direction pointed by the arrow T, so that the areas of the sections of the formed via hole 202 tend to decrease in the direction pointed by the arrow T. Due to the adoption of a way of forming the screen body 201 by superimposing a plurality of layers of sub-screen bodies 2011, it is easier to obtain the via hole of which the sectional areas tend to decrease in the direction T, and the inclination angles θ of the edges of the via hole 202 relative to the second surface S2 may also be controlled by adjusting the sizes of the sub-via holes 2021 in the different sub-screen bodies 2011, so that it is convenient to control the inclination angles θ, the process for producing the printing screen is simpler and more convenient, and the adjustability of a screen printing process is also enabled to be higher.

During specific implementation, in some embodiments of the disclosure, as shown in FIG. 11b, the via hole 202 is a stepped hole, in the sections, which are located in the direction vertical to the first surface S1 and pass through the central axis of the via hole 202, of the via hole 202, the line segment closest to the first surface S1 in the edges of the via hole 202 is a first line segment, the line segment closest to the second surface S2 is a second line segment, and the inclination angle of a straight line formed by a midpoint (namely a point M in the figure) of the first line segment and the vertex (namely a point N in the figure), at the side close to the first surface S1, of the second line segment relative to the second surface S2 is within the range of 45-67 DEG The inclination angles are set within the range, so that the printing precision may be relatively high.

Further, in the printing screen provided by some embodiments of the disclosure, as shown in FIG. 11a to FIG. 12b, the thicknesses of all the sub-via holes are the same in the direction from the first surface S1 to the second surface S2.

Further, in the printing screen provided by some embodiments of the disclosure, as shown in FIG. 11a to FIG. 12b, difference values of the areas of sections, parallel to the first surface S1, of any two adjacent sub-via holes forming the same via hole 202 are equal.

During specific implementation, in some embodiments of the disclosure, referring to FIG. 11b, the inclination angles θ may be determined according to the following formula:

$$\tan\theta = \frac{2\left(n-\frac{3}{2}\right)b}{X1-X2}; \quad (1)$$

wherein θ represents for the inclination angles, n represents for the total number of the sub-via holes in the same via hole 202, b represents for the thickness of one of the sub-via holes, X1 represents for the maximum value of the side lengths of the section, vertical to the first surface S1, of the first sub-via hole (namely the sub-via hole closest to the first surface S1 in the same via hole 202) in the same via hole 202 in the direction from the first surface S1 to the second surface S2, and X2 represents for the minimum value of the side lengths of the section, vertical to the first surface S1, of the last sub-via hole (namely the sub-via hole closest to the second surface S2 in the same via hole 202) in the same via hole 202 in the direction from the first surface S1 to the second surface S2.

With FIG. 11b in which the via hole includes three sub-via holes, namely n is equal to 3 as an example, n may be determined according to the inclination angle determining method when being other numerical values, but is not illustrated one by one herein. b represents for the thickness of each sub-via hole, and the thicknesses of all steps are the same, namely the thickness d of the screen body is equal to nb (d=nb). The maximum value of the side lengths of the section, parallel to the first surface S1, of the sub-via hole closest to the first surface S1 is X1, the minimum value of the side length of the section, parallel to the first surface S1, of the sub-via hole closest to the second surface S2 is X2, namely X1 represents for the hole diameter, at the side where the first surface S1 is located, of the via hole, and X2 represents for the hole diameter, at the side where the second surface S2 is located, of the via hole. The inclination angle θ is an angle between the straight line MN and the second surface S2, and the inclination angle θ can also be an included angle between the straight line MN and any one straight line parallel to the second surface S2, and therefore, the inclination angles may be determined by angles θ in triangles formed by the dotted lines in FIG. 11b.

The difference values of the areas of the sections, parallel to the first surface S1, of the sub-via holes corresponding to any two adjacent steps are equal, namely the difference values of the hole diameters of the sub-via holes corresponding to any two adjacent steps are equal, referring to FIG. 11b, the difference of positions of two adjacent steps is ΔX, and known from the figure, ΔX may be determined according to the following formula:

$$\Delta X = \frac{X1-X2}{2(n-1)}; \quad (2)$$

the inclination angles θ may be determined according to the following formula:

$$\tan\theta = \frac{\frac{1}{2}b+(n-2)b}{(n-1)\Delta X}; \quad (3)$$

the formula (1) may be obtained according to the formulae (2) and (3), of course, the inclination angles may also be determined by adopting other ways which are not limited herein.

As shown in FIG. 12b, FIG. 12b is the other sectional view at the dotted lines L1 in FIG. 7, when the via hole 202 is a stepped hole and is composed of a plurality of sub-via holes 2021, in the sections, in the direction vertical to the first surface S1, of the via hole 202 in the direction from the first surface S1 to the second surface S2, the inclination angle θ of a straight line formed by a midpoint (namely a point M in the figure) of the edge of the first sub-via hole and a vertex (namely a point N in the figure), at the side close to the first surface, of the edge of the last via hole relative to the second surface S2 is within the range of 45-67 DEG, wherein the first sub-via hole is the sub-via hole closest to the first surface S1, and the last sub-via hole is the sub-via hole closest to the second surface S2. In the actual application, the inclination angle may be determined by adopting the formula (1) or other ways which are not limited herein.

It should be explained that the printing precision obtained by setting the inclination angles within the range of 45-67 DEG is relatively high, FIG. 12b is illustrated by taking the screen body 201 including three layers of sub-screen bodies 2011 as an example, when the screen body 201 includes other numbers of sub-screen bodies 2011, the determination ways of the inclination angles θ are similar, and the descriptions thereof are omitted herein.

The slurry (such as the ink) for screen printing is a non-Newtonian fluid with a certain viscosity, the ink is attached to the printed material (the to-be-printed panel) through the via holes after the scraper is downwards pressed in the printing process, when the slurry with different viscosities penetrates through the via holes with different inclination angles, shear forces borne by the slurry are different, the shown printing precisions are also slightly different, as shown in table 1, the corresponding printing precisions are different when the slurry with different viscosities penetrates through the via holes with different inclination angles.

TABLE 1

Printing Precision Corresponding to Slurry with Different Viscosities and Via Holes with Different Inclination Angles

| VISCOSITY OF INK(CPS) | ANGLE OF VIA HOLE(°) | | | | | |
|---|---|---|---|---|---|---|
| | 34 | 45 | 56 | 67 | 78 | 90 |
| 960 | 4.66 | 4.89 | 4.42 | 4.38 | 4.69 | 4.72 |
| 1320 | 4.08 | 4.36 | 4.11 | 4.02 | 3.95 | 4.21 |
| 1680 | 3.56 | 3.64 | 2.76 | 2.24 | 2.62 | 3.96 |
| 2040 | 3.68 | 2.24 | 1.06 | 1.96 | 2.23 | 2.72 |
| 2400 | 2.24 | 1.01 | 0.78 | 0.86 | 1.97 | 2.51 |
| 2760 | 2.56 | 1.42 | 1.14 | 0.92 | 2.02 | 3.24 |

It may be seen from table 1 that the printing precision is relatively high when the inclination angles of the via holes are set within the range of 45-67 DEG and the viscosity of the slurry is set to be 2040 CPS-2760 CPS. Therefore, the relatively high printing precision may be obtained by matching the viscosities of the slurry with the inclination angles of the via holes.

Figure 13:
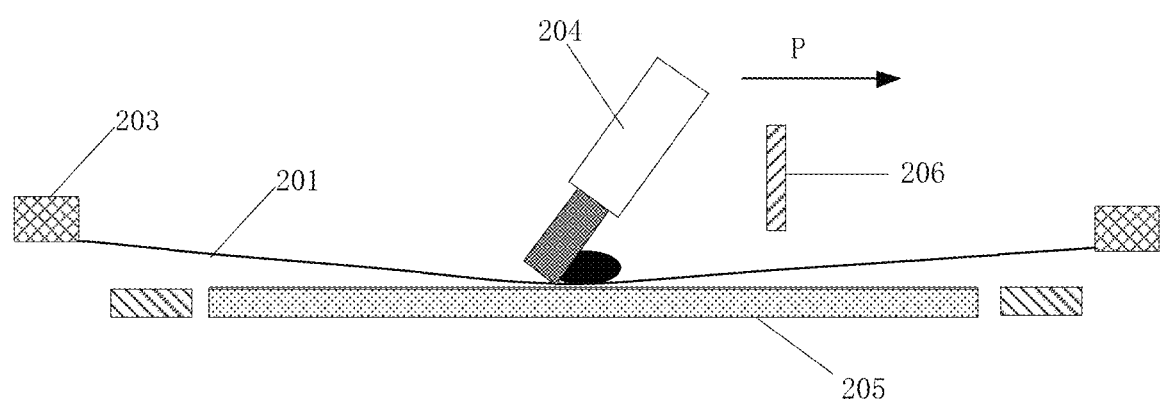
FIG. 13 is a first structural schematic diagram of printing equipment provided by some embodiments of the disclosure.
Figure 14:
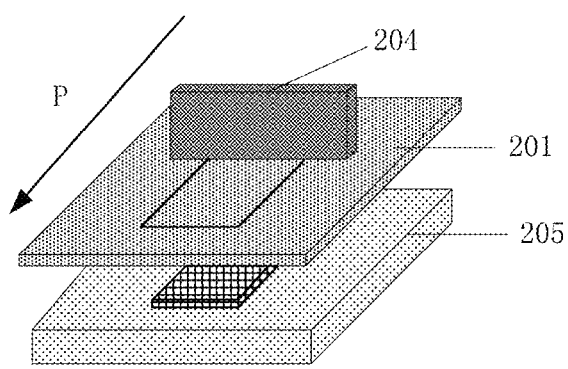
FIG. 14 is a second structural schematic diagram of the printing equipment provided by some embodiments of the disclosure.

The printing screen provided by some embodiments of the disclosure may be applied to screen printing equipment, as shown in FIG. 13 and FIG. 14, FIG. 13 and FIG. 14 are side views of different directions of the printing equipment, the printing equipment includes the printing screen, namely includes a frame 203, a screen body 201 fixedly arranged on the frame 203, a scraper 204, a printed material 205 and an ink returning knife 206 and the like, wherein the screen body 201 is the screen body provided by some embodiments of the disclosure. Namely a pattern region of the screen body 201 includes a plurality of via holes, the via holes have the characteristics the same as those of the via holes mentioned in the first aspect, the descriptions of the characteristics and beneficial effects of the via holes are omitted herein. The second surface of the screen body 201 faces the printed material 205, the slurry is placed on the first surface of the screen body 201 in the screen printing process, the scraper 204 descends and moves in a printing direction P to attach the slurry to the printed material 205 after the slurry passes through the via holes of the screen body 201, after the printing is completed, the scraper 204 ascends and the ink returning knife 206 descends to return the residual slurry to a printing starting position, and thus, a pattern corresponding to the pattern region of the screen body 201 is obtained on the printed material 205.

Based on the same inventive concept, some embodiments of the disclosure further provide a production method of a touch panel, the problem solution principle of the production method of the touch panel is similar to that of the printing equipment, so that the implementation of the production method of the touch panel may refer to that of the printing equipment, and the descriptions thereof are omitted herein.

Figure 15:
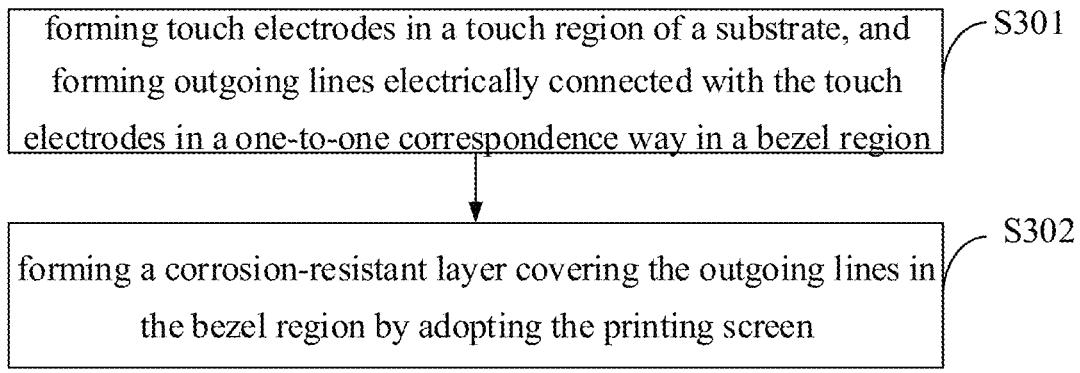
FIG. 15 is a flow diagram of a production method of the touch panel provided by some embodiments of the disclosure.

The production method of the touch panel provided by some embodiments of the disclosure, as shown in FIG. 15, includes:

S301, forming all touch electrodes in a touch region of a substrate, and forming outgoing lines electrically connected with all the touch electrodes in a one-to-one correspondence way in a bezel region;

S302, enabling the second surface of the printing screen provided by some embodiments of the disclosure to face the substrate (namely the substrate is used as a printed material), and forming a corrosion-resistant layer covering the outgoing lines in the bezel region by adopting the printing screen.

According to the production method of the touch panel provided by some embodiments of the disclosure, the corrosion-resistant layer covering the metal lines is formed by adopting the printing screen, and the printing precision of the printing screen is relatively high, so that the obtained corrosion-resistant layer is closer to the display region and is capable of covering all the metal lines. Therefore, the corrosion resistance of the touch panel obtained by using the production method provided by some embodiments of the disclosure is relatively high.

During specific implementation, the outgoing lines are generally produced by adopting a metal material, in some embodiments of the disclosure, the outgoing lines are optionally metal lines, of course, other materials may also be adopted, the materials of the outgoing lines are not limited herein.

The shielding effect of the ink is relatively good, in some embodiments of the disclosure, the corrosion-resistant layer may be produced by adopting the ink, so that the metal lines are prevented from being corroded. The material of the ink may include a product mixed in a black color masterbatch and cured by organic epoxy resin.

Further, in the production method provided by some embodiments of the disclosure, the step of forming a corrosion-resistant layer covering the outgoing lines in the bezel region by adopting the printing screen may include:

printing the ink of which the viscosity is within the range of 2040 CPS-2760 CPS in the bezel region by adopting the printing screen to form the corrosion-resistant layer covering the outgoing lines.

The ink is the non-Newtonian fluid with a certain viscosity, when the slurry with different viscosities penetrates through the via holes with different inclination angles, the shear forces borne by the slurry are different, the shown printing precisions are also slightly different, and therefore, the relatively high printing precision may be obtained by matching the viscosities of the ink with the inclination angles of the via holes. It may be seen from table 1 that the printing precision is relatively high when the inclination angles of the via holes are set within the range of 450-67 DEG and the viscosity of the slurry is 2040 CPS-2760 CPS.

Further, in the production method provided by some embodiments of the disclosure, the ink of which the viscosity is 2400 CPS is printed in the bezel region by adopting the printing equipment with the inclination angle being 56 DEG Seen from table 1, when the printing equipment with the inclination angle being 56 DEG and the ink of which the viscosity is 2400 CPS are adopted, the printing precision of the printing equipment is relatively high and may reach 0.78 mm, the distance from the obtained corrosion-resistant layer to the display region is closest, the metal lines may be covered to the maximum extent, and the yield of the obtained touch panel is relatively high.

In some embodiments of the disclosure, the corrosion-resistant layer obtained by adopting the printing equipment is capable of covering all the metal lines, and therefore, the metal lines may be produced by adopting the relatively cheap aluminum metal, and the production cost is greatly reduced as comparison with that of the metal lines produced by adopting silver metal. During specific implementation, the materials of the metal lines may be selected from aluminum, copper or silver according to actual demands and are not limited herein.

Based on the same inventive concept, some embodiments of the disclosure further provide a touch panel produced by adopting the production method. The touch panel may include a substrate, touch electrodes located in a touch region of the substrate, outgoing lines located in a bezel region of the substrate and electrically connected with the touch electrodes in a one-to-one correspondence way, and a corrosion-resistant layer located in the bezel region of the substrate. Moreover, an orthographic projection of the corrosion-resistant layer on the substrate covers orthographic projections of all the outgoing lines on the substrate. The problem solution principle of the touch panel is similar to that of the production method, and therefore, the implementation of the touch panel may refer to that of the production method, and the descriptions thereof are omitted herein.

Figure 16:
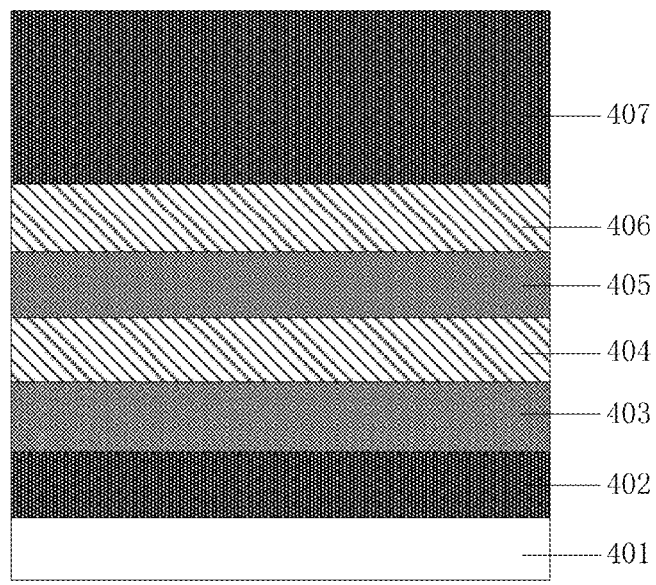
FIG. 16 is a sectional structural schematic diagram of the touch panel provided by some embodiments of the disclosure.

FIG. 16 is a structural schematic diagram of the touch panel, as shown in FIG. 16, the touch panel includes a substrate 401, a shielding layer 402 located on the substrate 401, a first metal layer 403 located on the shielding layer 402, a first protective layer 404 located on the first metal layer 403, a second metal layer 405 located on the first protective layer 404, a second protective layer 406 located on the second metal layer 405 and a corrosion-resistant layer 407 located on the second protective layer 406.

The overall surface of the substrate 401 is coated with the shielding layer 402 in a production process, and a pattern of the shielding layer 402 is obtained after exposure is performed by adopting a corresponding mask. A metal layer (such as a pure aluminum layer) with the thickness being about 300 angstroms is formed on the overall surface of the shielding layer 402 by adopting a sputtering process. A layer of photoresist is formed on the metal layer and is exposed and developed to obtain a corresponding pattern, and the pattern is etched for 120 s by adopting chloroazotic acid to obtain a metal grid pattern of the touch electrodes. Then, the overall surface of the first metal layer 403 is coated with the first protective layer 404 which is cured at the temperature of 220 DEG C. The second metal layer 405 is produced on the first protective layer 404 by adopting a process similar to that of the first metal layer 403. The second protective layer 406 is produced on the second metal layer 405 by adopting a process similar to that of the first protective layer 404. Finally, the corrosion-resistant layer 407 is produced on the second protective layer 406 by adopting the printing equipment. During specific implementation, the shielding layer 402 and the corrosion-resistant layer 407 may adopt the same material such as the product mixed in the black color masterbatch and cured by the organic epoxy resin.

Based on the same inventive concept, some embodiments of the disclosure further provide a display device including the touch panel. The problem solution principle of the display device is similar to that of the touch panel, so that the implementation of the display device may refer to that of the touch panel, and the descriptions thereof are omitted herein.

During specific implementation, in some embodiments of the disclosure, the display device may be any product or component with a display function, such as a mobile phone, a tablet personal computer, a television, a display, a notebook computer, a digital photo frame and a navigator. Other essential components of the display device are should be understood to be provided by the ordinary skill in the art, the descriptions thereof are omitted herein, and other essential components are should not be used as limits to the disclosure.

According to the printing screen, the touch panel, the production method of the touch panel, and the display device provided by some embodiments of the disclosure, ink may be gathered towards the centers of the via holes in the printing process by making the areas of the sections, located on the first surface, of the via holes be larger than the areas of the sections, located on the second surface, of the via holes in the direction parallel to the screen body, namely making the hole diameters of the via holes in the second surface be smaller than the hole diameters of the via holes in the first surface, so that the position of the ink is more precise, and furthermore, the printing precision is improved. The printing ink may be closer to the display region when the touch panel is produced, so that the corrosion-resistant layer obtained by printing may cover more metal lines, and furthermore, the metal lines are not easy to corrode.

Obviously, various alterations and modifications may be made by the skilled in the art without departing from the spirit and scope of the disclosure. Thus, if the alterations and modifications of the disclosure belong to the scope defined in the claims of the disclosure and equivalent technologies thereof, the disclosure further intends to include the alterations and modifications.

The invention claimed is:

1. A printing screen, comprising:
a frame;
a screen body fixed on the frame, wherein a pattern region of the screen body is provided with a plurality of via holes formed through the screen body, and the screen body is provided with a first surface and a second surface;
and areas of sections, located on the first surface, of the via holes are larger than areas of sections, located on the second surface, of the via holes in a direction parallel to the screen body;
wherein the via holes comprise a plurality of sub-via holes in a direction from the first surface to the second surface, and the plurality of sub-via holes in a same via hole form a step shape; wherein thicknesses of the sub-via holes are same in the direction from the first surface to the second surface; wherein an inclination angle of the via holes is determined according to following formula:

$$\tan\theta = \frac{2\left(n - \frac{3}{2}\right)b}{X1 - X2};$$

wherein θ represents for the inclination angle, n represents for a total number of the sub-via holes in a same via hole, b represents for a thickness of one of the sub-via holes, X1 represents for a maximum value of side lengths of the section, vertical to the first surface, of the first sub-via hole in a same via hole in the direction from the first surface to the second surface, and X2 represents for a minimum value of the side lengths of the section, vertical to the first surface, of the last sub-via hole in the same via hole in the direction from the first surface to the second surface.

2. The printing screen according to claim 1, wherein the screen body comprises at least two layers of sub-screen bodies; a pattern region of the sub-screen bodies is provided with a plurality of sub-via holes formed through the sub-screen bodies, and areas of the sections, parallel to the first surface, of the sub-via holes forming a same via hole sequentially decrease in the direction from the first surface to the second surface.

3. The printing screen according to claim 2, wherein the inclination angle of the via holes is within the range of 45-67 DEG.

4. The printing screen according to claim 1, wherein a shape of the sub-via holes is a right cylinder.

5. The printing screen according to claim 1, wherein difference values of the areas of the sections, parallel to the first surface, of any two adjacent sub-via holes forming a same via hole are equal to each other.

6. The printing screen according to claim 1, wherein a shapes of the sections, parallel to the first surface, of the via holes includes at least one of square, round or rectangle.

7. A production method of a touch panel, comprising:
forming touch electrodes in a touch region of a substrate, and forming outgoing lines electrically connected with the touch electrodes in a one-to-one correspondence way in a bezel region;
enabling the second surface of the printing screen according to claim 1 to face the substrate, and forming a corrosion-resistant layer covering the outgoing lines in the bezel region by adopting the printing screen.

8. The production method according to claim 7, wherein the forming a corrosion-resistant layer covering the outgoing lines in the bezel region by adopting the printing screen comprises:
printing ink of which the viscosity is within a range of 2040 CPS-2760 CPS in the bezel region by adopting the printing screen to form the corrosion-resistant layer covering the outgoing lines.

9. A touch panel, being produced by adopting the production method according to claim 7;
the touch panel, comprising:
a substrate;
touch electrodes, located in a touch region of the substrate;

outgoing lines, located in a bezel region of the substrate and electrically connected with the touch electrodes in a one-to-one correspondence way; and a corrosion-resistant layer, located in the bezel region of the substrate;

an orthographic projection of the corrosion-resistant layer on the substrate covering orthographic projections of the outgoing lines on the substrate.

\* \* \* \* \*